Patented Sept. 8, 1936

2,053,871

UNITED STATES PATENT OFFICE 2,053,871

NOVEL FOOD PRODUCT AND METHOD OF MAKING THE SAME

Guy Leonard, Baltimore, Md., and Byron E. Eldred, Scarsdale, N. Y., assignors to Sukro Corporation, a corporation of Delaware No Drawing. Application April 22, 1935, Serial No. 17,574

6 Claims. (Cl. 99—6)

This application relates to methods of preparing edible substances and to the products resulting therefrom. It is a continuation in part of our copending application Serial No. 732,662, filed June 27, 1934.

An object of the invention is to produce a food product containing a relatively high content of molasses, corn syrup or other deliquescible sugar materials in which the deliquescible sugar is prevented from becoming sticky and remains substantially dry even in humid atmosphere.

Another object of the invention is to mix an oil bearing meal or similar food material with molasses, either liquid or dehydrated, and heat the mixture to a minimum of 80° C. so that the oil from the meal intermingles with the molasses and renders the mixture not detrimentally deliquescent.

Another object of the invention is to mix an oil bearing meal, or a non-oil bearing meal with addition of suitable oil, with either dehydrated or liquid molasses and heating the mixture, to partially saponify the oil and preserve the mixture in a non-sticky condition.

Another object of the invention is to mix molasses either alone or with a non-oil bearing food material with saponification products to prevent the molasses or the molasses mixture from becoming excessively deliquescent, thereby causing tackiness or stickiness.

Another object is to provide food mixtures containing invert sugar which has been rendered suitably non-deliquescent to fortify the mixture against fermentation and mold under normal atmospheric conditions.

Other objects will appear in the following description.

It is well known that molasses is an important live stock food and it is frequently mixed at the place of consumption with other foods such as the various meals, bran, middlings and mill by-products, and used also in liquid state.

Liquid molasses varies in viscosity with the temperature and it is difficult for the consumer to satisfactorily mix it with other ingredients of the live stock food under all weather conditions. Furthermore, under the most favorable temperature conditions the mixing of liquid molasses with the other ingredients is a "messy" and disagreeable task. For these reasons liquid molasses has not been used to as great an extent as desirable by live stock feeders.

Proposals have been made to form a food product containing such small percentage of molasses that the moisture from the molasses is absorbed by the large quantity of absorbent foods. To absorb the molasses in this way bran, ground bagasse, hay, oats and other absorbers have been used. In all these cases the molasses renders the mixture tacky and disagreeable to handle, and in some cases the mixture has been heated to dry out the molasses.

These prior art products may be sufficiently non-deliquescent for a time but soon absorb sufficient moisture to again become sticky. This tendency has been partly met by pressing the mixture into blocks in which the tackiness is not so objectionable because of the size of the blocks but the surface still will be sticky.

Because of this objectionable stickiness of the prior art food products molasses has never been successfully mixed with food materials except in small proportions.

Still another method has been to dehydrate the molasses before shipment to the consumer. Dehydrated molasses deliquesces very quickly and in a comparatively short time the dehydrated mass in contact with the atmosphere will be transformed to the original liquid state, even in localities where the atmosphere contains only a normal amount of moisture. The dehydrated molasses therefore has been shipped in expensive moisture excluding containers involving considerable expense. The consumer has no use for such containers when empty and the expense of shipment prevents their being returned to the dehydrating plant. On opening up the moisture-proof containers moist air immediately contacts with the contents and a sticky coating forms at the top. This dehydrated product while commercially used to some extent, is nevertheless far from satisfactory and many attempts have been made to improve upon it but, until our discovery, without success.

Molasses is a very valuable food product for animals and the inability of the prior art methods to produce a product of high molasses content is a serious disadvantage to stock feeders as well as to producers of sugar products who annually produce enormous quantities of molasses as a byproduct or residue in the sugar manufacturing process.

In accordance with our process we are able to produce food products containing as high as 45% molasses, and more, and the mixture remains substantially dry to the touch and in granular condition even when subjected to very humid atmospheres.

In our process we may use either dehydrated molasses or liquid molasses.

In carrying out the process we take an oil bearing meal preferably heated to a temperature where the oil freely exudes from the meal grains and mix it with, by way of example, as high as 45% liquid molasses preferably preheated to about the same temperature. The mixing is carried on in any suitable mechanical mixer and the temperature maintained for a short time until the mixture appears to be substantially dry. In this process a considerable portion of the moisture in the molasses evaporates and a further amount is absorbed by the meal which has exuded the oil in the presence of heat. At any rate, after a limited time the mixture becomes to all intents and purposes substantially dry and non-sticky.

It is of course possible to start the process in the mixer with both materials cold and bring them up to temperature but for commercial operation it is more efficient to preheat both materials before going to the mixer.

The temperature to which the mixture is heated varies to a limited extent, depending upon the oil bearing meal chosen. The mixture should be heated to a minimum of about 80° C., as at such temperature a material part of the oil from the oil bearing meal saponifies. The saponification products which contain glycerine, fatty acids and the salts of such acids thus intermingle with the molasses grains during the mixing process. With cotton seed meal the meal should be heated to a minimum of about 80° C. at which temperature the oil starts to exude from the grains, but it is advisable to heat the mixture somewhat higher, to accelerate the saponification of the oil and the mixture of molasses and meal should be held above 80° C. until the saponification products are commingled with the molasses grains and the finished product is substantially dry and granular.

It will retain this non-sticky character and remain apparently dry even in the open air in localities where excessive humidity exists, although tests show that nominal moisture is absorbed on standing in the open air. The mixture will not absorb sufficient moisture to render the product sticky.

If we use a dehydrated molasses for mixing with the oil bearing meal the same beneficial action takes place. That is, a material part of the oil from the oil meal saponifies and prevents the molasses grains from becoming sticky. With dehydrated molasses substantially no moisture is absorbed by the meal grains during the mixing process because of the dehydrated condition of the molasses. On standing in the air moisture is absorbed by the mixture so that the final condition as to moisture is substantially the same as when liquid molasses is used in the process, and with like results, that is, the product still retains its apparent dryness and is non-sticky even in humid atmospheres.

Any edible oil bearing meal other than cotton seed meal may be used in the process with little change in temperature and time of mixing, and as examples, we mention linseed meal, peanut meal, corn meal, soy bean meal, rape seed meal and distillers' and brewers' grains. The desideratum is to heat the mixture at as low a temperature as feasible for obtaining results so that there will be no danger that the molasses will be caramelized or the meal scorched. Fortunately sufficient saponification takes place at relatively low temperatures so that these objections are readily avoided.

Obviously, the dehydrated molasses may be mixed with saponification products when desired in the dehydrating process, or after dehydration, so as to obtain non-sticky granular molasses.

The saponifiable oils or crude fats, can also be added to molasses mixed with non-oil bearing meals or other food ingredients and heated as already described to produce the desired food mixture.

It would appear that saponification of a material part of the oils is caused by the generated steam vapor and soluble albuminous matter in the meals and molasses, but regardless of this assumption the process produces a remarkably granular food product that will not become sticky or tacky in a humid atmosphere, and the invention is not to be limited to any particular theory.

We have mentioned molasses and corn syrup as sugars to be used in the food product but the invention is not to be limited thereto. Any other non-crystallizable or invert sugar is an equivalent thereof.

Having described our invention, what we claim is:

1. A food product consisting of a mixture of dehydrated molasses and a substantial quantity of a saponification product to prevent the molasses from detrimentally deliquescing.

2. A food product that is non-sticky in a humid atmosphere, consisting of an edible substance, dehydrated molasses and a saponification product.

3. A food product that is non-sticky in a humid atmosphere consisting of an edible substance, dehydrated molasses and a saponification product, said molasses being present in substantial quantity to render the mixture sticky through deliquescence except for the presence of the saponification product.

4. A food product consisting of a mixture of deliquescible sugar and a substantial quantity of a saponification product to prevent the sugar from detrimentally deliquescing.

5. The process of making a non-sticky molasses food product which consists in mixing molasses, a saponifiable oil and a saponifying agent, and heating the mixture until it becomes substantially dry and saponification products are produced from the oil.

6. The process of making a non-sticky molasses food product which consists in mixing molasses, and an oil bearing meal, and heating the mixture at substantially 80° C. until it becomes substantially dry and saponification of the oil is produced.

GUY LEONARD.
BYRON E. ELDRED.